June 19, 1956 L. D. BRANNEN 2,750,746
SAFETY DIAPHRAGMS FOR HYDRAULIC BRAKES
Filed June 29, 1953
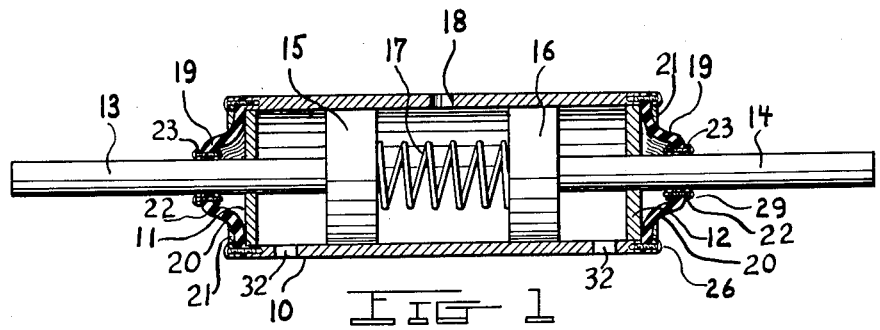
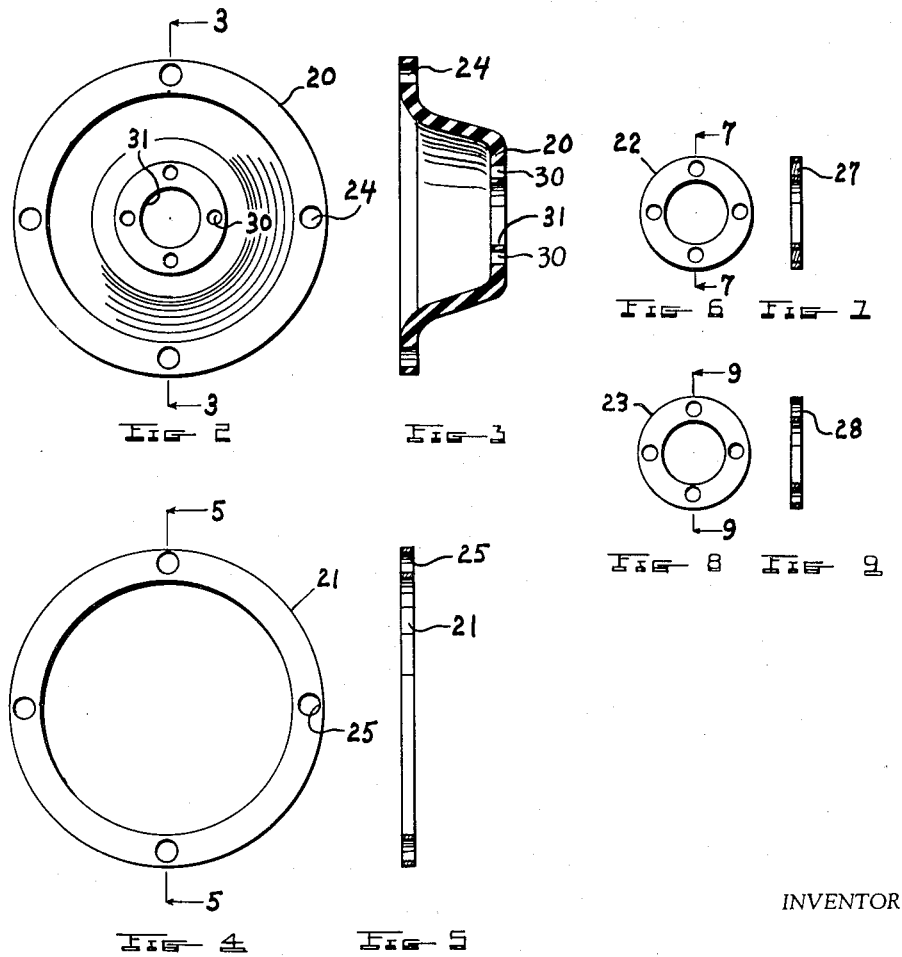
INVENTOR
Lee D. Brannen

2,750,746

SAFETY DIAPHRAGMS FOR HYDRAULIC BRAKES

Lee D. Brannen, Rome, Ga.

Application June 29, 1953, Serial No. 364,698

2 Claims. (Cl. 60—54.6)

This invention relates to a safety diaphragm for hydraulic vehicle brakes.

It is an object of the present invention to provide a diaphragm adapted to be placed over the end of a brake cylinder so that upon the end of the cylinder being blown, the fluid will be collected and prevented from leaving the brake system so that instead of having all four brakes, some action will be had on all of the brakes though with less effect but sufficient to permit the vehicle to be used and to have some effect from the brakes.

It is another object of the invention to provide a diaphragm which can be used on brake cylinders that may be rigidly connected to the rod as it slides in and out of the cylinder and so that a fluid-tight connection can be had with the rod and with the end of the cylinder and which will also serve to keep foreign matter out of the cylinder and which will act as and replace the rubber seal that is used in the present brake cylinders.

Other objects of the invention are to provide a safety diaphragm for hydraulic brake cylinders which is of simple construction, inexpensive to manufacture, easy to apply to the end of the cylinder, has a minimum number of parts, compact, light in weight and efficient in operation.

For a better understanding of the invention, reference may be had to the following detailed description taken in connection with the accompanying drawing, in which:

Figure 1 is a longitudinal sectional view of a brake cylinder with the diaphragm of the present invention attached to the cylinder at the respective opposite ends thereof;

Fig. 2 is a front elevational view of the diaphragm detached from the cylinder;

Fig. 3 is a vertical sectional view of the diaphragm;

Fig. 4 is a plan view of the ring for attaching the diaphragm to the cylinder;

Fig. 5 is a vertical sectional view of the retaining ring as viewed on line 5—5 of Fig. 4;

Fig. 6 is a plan view of the inner washer;

Fig. 7 is a sectional view of the inner washer as viewed on line 7—7 of Fig. 6;

Fig. 8 is a plan view of the outer washer;

Fig. 9 is a sectional view of the outer washer taken on line 9—9 of Fig. 8.

Referring now to the figures, 10 represents a brake cylinder adapted to be disposed between the brake shoes and within the brake drum. This cylinder has closed ends 11 and 12. Operable through the closed ends are respectively piston rods 13 and 14 having respectively pistons 15 and 16. These pistons are urged away from each other by a compression spring 17 and exhausted to the atmosphere through exhaust hole 18. Fluid is delivered to the opposite ends of the cylinder through inlets 32 and the pistons 15 and 16 are urged toward one another against the action of the compression spring 17. The compression spring 17, upon the fluid leaving the ends of the cylinder through inlets 32, will urge the pistons forwardly and the piston rods outwardly through the respective ends of the cylinder.

In order to prevent the rupture of the system, there is provided on each end of the cylinder, according to the present invention, a flexible diaphragm assembly indicated generally at 19. Each assembly comprises a diaphragm 20, a large retaining ring 21, inner and outer washers 22 and 23.

The diaphragm 20 is attached to the end of the cylinder by a retaining ring 21. This diaphragm has circumferentially spaced holes 24 adjacent its outer periphery and the ring 21 has circumferentially spaced holes 25 adapted to register with the holes 24 of the diaphragm and the holes of both the diaphragm and the ring receiving fastening screws 26 which are secured into the end of the cylinder.

The inner washer 22 has threaded holes 27 angularly spaced about the same and outer washer 23 has unthreaded holes 28 through which fastening screws 29 are extended. These screws 29 pass through holes 30 in the diaphragm 20 adjacent to the central piston rod opening 31, which latter opening receives the piston rod therethrough in sealing engagement therewith.

The washers 22 and 23 tightly fit about the piston rods and secure the diaphragm against displacement thereon. The diaphragm can be worked as the pistons 15 and 16 are worked and should there be any blow out of the ends 11 and 12 of the cylinder, the fluid will be collected by the diaphragm and prevented from leaving the system. The fluid will be expanded to some extent but not sufficiently to lose the effect upon the brakes. The operator might well have the effect of three and one-half brakes instead of losing the entire amount of braking action which would result when the brake cylinders blow.

While various changes may be made in the detail construction, it shall be understood that such changes shall be within the spirit and scope of the present invention as defined by the appended claims.

What is claimed is:

1. A safety diaphragm assembly for brake cylinders comprising a diaphragm having a central opening for sealingly receiving a piston rod therethrough, said diaphragm comprising a substantially cup-shaped member formed around its open end with a flange portion adapted to abut the end of the cylinder, a retaining ring having angularly spaced openings therein and adapted to overlie said flange on the outer face thereof, said flange having angularly spaced openings therein adapted to be registered with the angularly spaced openings of the retaining ring, fastening screws within said registered openings and screw threaded into the brake cylinder end for securing the ring and the diaphragm flange to the end of the brake cylinder, said diaphragm including an outer end wall having said central opening therethrough, a washer on the inner and outer faces of said diaphragm end wall surrounding said central opening therein, said inner and outer washers having angularly spaced openings therein adapted to be brought into registration with each other, said inner and outer washers fitting tightly onto the piston rod in fixed engagement therewith, said diaphragm end wall surrounding said central opening having angularly spaced openings therein adapted to be registered with the angularly spaced openings in said inner and outer washers, and second screw means extending through said angularly spaced washer and diaphragm end wall openings to rigidly fix the diaphragm end wall to the washers and piston rod.

2. In combination, a brake cylinder having pistons therein, piston rods associated with the respective pistons, said cylinder having closed ends receiving said piston rods slidably therethrough, a diaphragm and retaining ring means for securing said diaphragm to the outside of the respective closed ends of the cylinder, each of said diaphragms being substantially cup-shaped and having an outer end wall having a central opening therethrough adapted to receive said piston rods in sealing engagement therethrough, washers on the inner and outer faces of each of said diaphragm end walls surrounding the central openings therein, each of said inner and outer washers having aligned angularly spaced openings therethrough, said inner and outer washers fitting tightly onto the piston rod in fixed engagement therewith, said diaphragm end walls having angularly spaced openings therein surrounding the central openings therein and adapted to be registered with the angularly spaced openings in said inner and outer washers, and screw means extending through said angularly spaced inner and outer washer and diaphragm end wall openings to fixedly connect the diaphragm end walls to the piston rods.

References Cited in the file of this patent

UNITED STATES PATENTS

| | | |
|---|---|---|
| 1,972,829 | Oliver | Sept. 4, 1934 |
| 2,115,383 | Christensen | April 26, 1938 |
| 2,175,446 | Rasmussen et al. | Oct. 10, 1939 |